March 6, 1962

H. C. VAUGHAN 3,023,502

APPARATUS FOR ESTABLISHING THE RELATIONSHIP OF
COMPONENTS OF AN ARTIFICIAL DENTAL ARCH
OR A NATURAL DENTAL ARCH

Filed Feb. 5, 1960

INVENTOR.
HOMER C. VAUGHAN
BY Kane Dalsimer + Kane

ATTORNEYS

March 6, 1962
H. C. VAUGHAN
3,023,502
APPARATUS FOR ESTABLISHING THE RELATIONSHIP OF
COMPONENTS OF AN ARTIFICIAL DENTAL ARCH
OR A NATURAL DENTAL ARCH
Filed Feb. 5, 1960
2 Sheets-Sheet 2
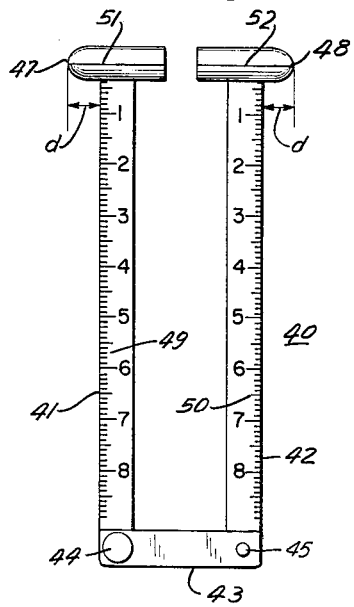
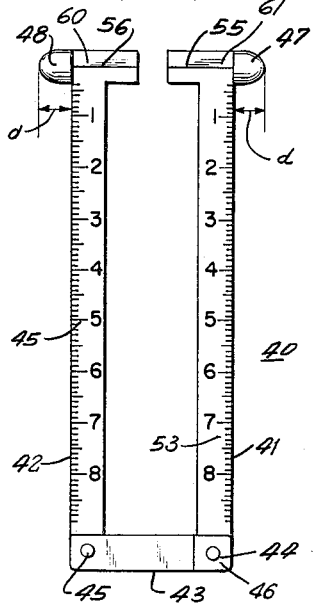
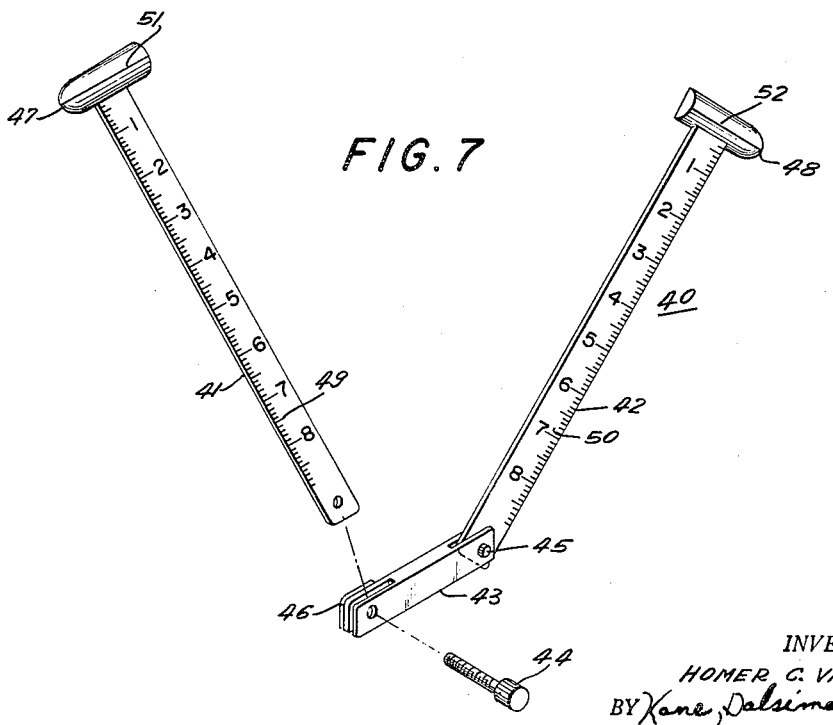
INVENTOR.
HOMER C. VAUGHAN
BY Kane, Dalsimer + Kane
ATTORNEYS United States Patent Office 3,023,502
Patented Mar. 6, 1962

3,023,502
APPARATUS FOR ESTABLISHING THE RELATIONSHIP OF COMPONENTS OF AN ARTIFICIAL DENTAL ARCH OR A NATURAL DENTAL ARCH
Homer C. Vaughan, Manhasset, N.Y.
(608 5th Ave., New York, N. Y.)
Filed Feb. 5, 1960, Ser. No. 6,944
5 Claims. (Cl. 32—40)

This invention relates to an improved apparatus for establishing the anterior-posterior position of a mandibular dental arch. More specifically, it relates to improved apparatus for locating the position of the second molar in such an arch in relation to the anterior contracting border of the masseter muscle.

The normal, natural endentulous or partially endentulous jaw is asymmetrical, thus making it extremely difficult to construct dentures and correctly position them. This invention measures this asymmetry and correlates it in a denture, bridge or orthodontic appliance.

Prior to the invention disclosed in my co-pending application, Serial No. 578,511, filed April 16, 1956, now Patent No. 3,002,277, it was extremely difficult to accurately position the second molar in a denture. In actual practice, the tooth was, and still is, moved around until the bite became correct. This was a clumsy operation and not accurate.

I have established that the correct position of a second molar is related to the anterior contracting border of the masseter muscle. Specifically, I have found in several hundred patients, that the anterior border of the masseter muscle was consistently immediately distal of the mandibular second molar during contraction. I have additionally discovered that the distance between the buccal surface of the second molar and the external oblique ridge of the mandible is between 5 and 7 mm. Since this tooth may be located relative to means separate from the jaw bone, it becomes a perfect base tooth for use in designing a dental arch.

The recognition of these facts is very important in that (1) it offers a physiologically correct and useful place from which to project the anteroposterior location of the artificial dental arch; (2) it relates the arch correctly to the customary application of force by the "masticatory muscles," thus lessening the posterior fulcrum action during isometric contractions at tooth level, and decreasing the tilting force during isometric manipulations. These observations indicate that the most important single tooth placed on an artificial complete or free-end partial denture is the mandibular second molar.

It is an object of this invention to provide apparatus which can be used to practice my method which is disclosed in my previously mentioned co-pending application and which will also be useful in positioning the final arrangement of the remainder of the teeth in the arch.

With this and other objects in mind, reference is had to the attached sheet of drawings, illustrating one form of the invention and to which:

FIG. 5 is a front view of a third positioning gauge which is still another embodiment of my invention.

FIG. 6 is the back view of the gauge illustrated in FIG. 5; and

FIG. 7 is an exploded view of the gauge illustrated in FIGS. 5 and 6.

Figure 1:
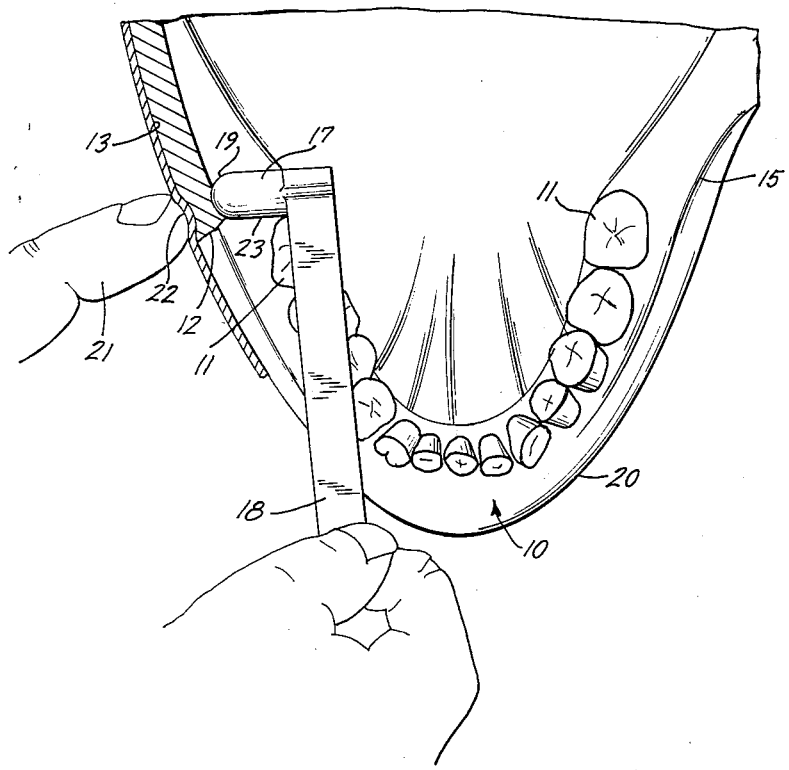
FIG. 1 shows the positioning of a second molar, in relation to the anterior contracting border of the masseter muscle, by the use of a positioning gauge, which is one embodiment of my invention.

In order to provide a better understanding of my invention, I will first describe the method which may be practiced by my invention and which has been disclosed in my previously mentioned copending application.

In considering the method of locating the anterior-posterior position of a mandibular dental arch, the numeral 10 indicates the lower jaw of a human mouth. Due to the asymmetrical shape of the average jaw, base points from which the work must be located when constructing a mandibular dental arch. The second molar 11—due to the fact that it may be located by means external of the jaw—is a good base point. I have established that for the proper functioning of the jaw, the second molar must be aligned relative to the anterior contracting border 12 of the masseter muscle 13. Specifically, and as previously stated, I have found that the anterior border of the masseter muscle is consistently immediately distal of the mandibular second molar during contraction. Also the buccal surface 14 of the second molar 11 is usually spaced between 5 and 7 mm. from the external oblique ridge of the mandible 15. Research has shown that 6 mm. is average, with 90% of the cases studied varying between 5 mm. and an extreme 7 mm.

Figure 3:
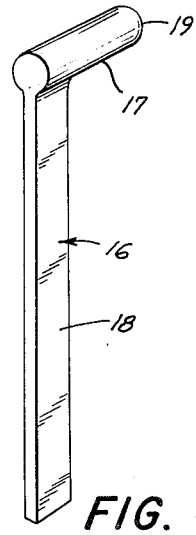
FIG. 3 is a perspective view of the positioning gauge illustrated in FIGS. 1 and 2.
Figure 2:
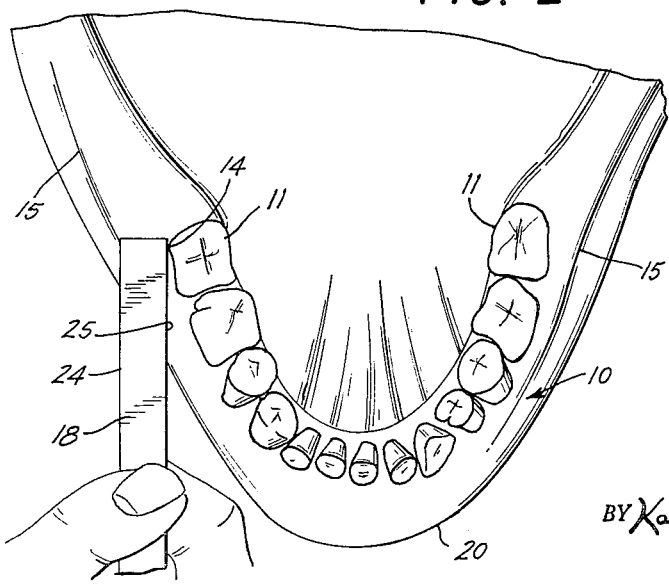
FIG. 2 illustrates the positioning of the second molar, in relation to the external oblique ridge of the mandible, by the use of the positioning gauge illustrated in FIG. 1.

In the preparation of a mandibular dental arch, the second molar may be located with the aid of a muscle arch indicator gauge 16 (FIG. 3). The gauge, as shown, comprises a blunt-headed finger 17 and an elongated flat handle shank 18 of a desired width (usualy 5 mm.), rigidly connected to the end of the finger 17 on the end directed away from the blunt head 19, and perpendicular to the axis of the finger 17. The muscle arch indicator may be constructed of a durable material, such as metal, or it may be made of an inexpensive disposable material, such as wood or plastic.

When constructing the mandibular dental arch, a mold 20 is made of the mandibular arch and inserted in the mouth in covering relation with respect to the lower jaw. The anterior contracting border 12 of the masseter muscle 13 is located by the operator's finger 21 and pressure is applied by the finger at that point. The blunt-headed finger 17 of the muscle arch indicator gauge 16 is placed in the mouth with the blunt-head 19 of the finger 17 adjacent the tip 22 of the finger 21, such that the lower edge 23 and the anterior contracting border 12 of the masseter muscle 13 are aligned. This may be accomplished as shown in FIG. 1. A second molar 11 is then mounted on the mold 20 abutting finger 17 at edge 23. In this manner, the second molar is aligned with the anterior contracting border of the masseter muscle.

It has been observed that whenever the body of the mandible (not the alveolar ridge) is large the distance between the buccal surface and the second molar and the external oblique ridge found in the adult will approach a 6 to 7 mm. measurement and when the body of the mandible is small, the distance approaches a 5 mm. measurement.

In order to properly space the second molar 11 from the external oblique ridge of the mandible 15, the elongated handle gauge 18 of the muscle arch indicator 16 is placed in the mouth with an edge 24 adjacent and generally parallel to the external oblique ridge of the mandible 15. The second molar 11 is then shifted laterally until the buccal surface 14 abuts the edge 25 of the gauge 18. In this manner, the second molar is properly spaced from the external oblique ridge of the mandible if the body of the mandible is small. However, if the body of the mandible is observed to be average or large, then the second molar will have to be moved back laterally one or two more millimeters respectively, by hand or and preferably by having more than one gauge with the various widths that is 5, 6 and 7 millimeters.

When the second molar has been located with respect to the external oblique ridge of the mandible and aligned with the anterior contracting border of the masseter muscle, it may be secured against movement in the bridge.

The above method should be repeated on the opposite end of the mandibular arch and another second molar secured in place. Once this has been done, two base points exist on which to build the remainder of the arch.

In a case where the above operation is performed to relocate natural teeth, the teeth may be protected by covering finger 17 with a resilient collar of rubber or other soft material.

Figure 4:
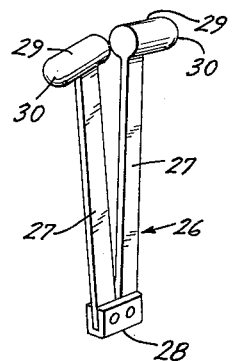
FIG. 4 is a perspective view of a second positioning gauge which is another embodiment of my invention.

FIG. 4 of the drawings illustrates an alternative form of the muscle arch indicator gauge 18. The double action muscle arch indicator gauge 26 comprises two elongated flat handle shanks 27 movably hinged at pivot bar 28 for free movement with relation to the bar in such manner that in their closed position, shanks 27 will be adjacent and parallel with each other. Each shank 27 has a blunt-headed finger 29 rigidly connected perpendicular to its length at the end opposite the hinge 28. In the closed position of shanks 27, the fingers 29 abut each other at their ends opposite blunt heads 30. A scale, preferably in millimeters, is cut in shanks 27. This double-action muscle arch indicator gauge facilitates the construction of the mandibular dental arch, in that the second molars, on either end of the dental arch may be aligned with the anterior contracting borders of their respective masseter muscles in the same operation. Furthermore, if the jaw is asymmetrical, the double action indicator gauge will adjust itself to the true shape of the jaw, because each blade 27 is freely movable in relation to pivot bar 28.

The gauge 26 is operated much the same as the muscle arch indicator 16 when aligning the second molar with the anterior contracting border of the masseter muscle. The anterior contracting border of the muscle is located with the tip of the operator's finger placed outwardly of the cheek and the gauge 26 is inserted in the mouth in such a position that blunt head end 30 lies adjacent the tip of the operator's finger pressing against the outer surface of the cheek. Without moving or withdrawing gauge 26 from the mouth, the blades 27 are separated from their closed position and the other blunt-headed finger 29 is aligned with the anterior contracting border of the masseter muscle on the opposite end of the mandibular arch. When both gauges are in place, the molars are positioned as above described.

The scale of the gauge 26 shown in FIG. 4 may be utilized to facilitate the correct location of a second molar in a denture. The scale has not been shown in FIG. 3 and FIG. 4. However, it may be incorporated in these instruments.

In operation, the instrument of either FIG. 3 or 4 is located with respect to the anterior contracting border of the masseter muscle as above described. If the instrument of FIG. 3 is to be used a measurement is then taken from the distal surface of the second molar to the distal border of the lower cuspid, utilizing the gauge scale. If the lower cuspid is not present then a measurement is taken from the distal surface of the second molar to the projected corner of the vermillion border of the lips. The important thing is to have a convenient reference point to which the distance from the distal surface of the mandibular second molar can be measured. If the instrument of FIG. 4 is to be used, a measurement can be taken from the distal surface of each second molar to the distal surface of the lower incisor teeth. The measurements may then be transferred to a denture by placing the appropriate portion of gauge scale adjacent the distal surface of the lower cuspid or incisor, depending on which instrument was used, and moving the second molar such that it abuts finger 17 or 29.

This, of course, presumes that the width of the gauge being used corresponds to the type body of the mandible. If the gauge is properly positioned then the buccal surface of the second molar will be properly spaced from the external oblique ridge of the mandible. Techniques can be developed as to which reference points or surfaces or whatever may be best utilized, and I have provided a gauge with a scale which will facilitate this measurement and this gauge has a properly selected width portion which can be utilized to properly position the buccal surface of the second molar from the external oblique ridge.

FIGS. 5, 6 and 7 of the drawings illustrates an improved muscle arch indicator gauge 40. This gauge 40 comprises two elongated flat handle shanks 41 and 42 both of which are movably hinged on member 43 at the pivot pins 44 and 45 respectively. At least one of the shanks should be readily disassembled to provide a gauge similar to, but an improvement on gauge 16, as will be seen later, and in the drawings, shank 41 is so illustrated. Shank 41 is indicated as being secured to member 43 by a machine screw 44 and therefore the hole portion 46, may be correspondingly threaded.

Shanks 41 and 42 are both independently pivotable around the pins 44 and 45 respectively, but member 43 at the same time is pivotable relative to shanks 41 and 42.

Each shank 40 and 41 has a blunt-headed finger 47 and 48 respectively rigidly connected perpendicular to its length at the end opposite their respective pivot points 44 and 45. As can be best seen in FIG. 6, these blunt-headed fingers 47 and 48 are cut such that the surfaces shanks 42 and 41, respectively. Each shank member has inscribed thereon a scale on each side preferably in millimeters and initiated from the middle, or in line with, the tip end of the blunt-headed fingers 47 and 48. It is not essential to the invention where the scale has its origin and in certain situations it could be advantageous to have the origin of the scale in line with the tip end of the blunt-headed fingers 47 and 48. Shank 41 has the scales 49 and 53 inscribed thereon emanating from the base lines 51 and 55 respectively and shank 42 has the scales 50 and 45 inscribed thereon emanating from the base lines 52 and 56 respectively.

In this embodiment of the invention the blunt-headed fingers 47 and 48 are of a predetermined length illustrated as "d." This distance may be either 5, 6 or 7 mm. depending upon the size of the mandible as previously discussed. This feature facilitates the use of this tool, and the second molar on each side can be located in one operation. Also shank 41 can be dissassembled from the unit 40 by merely unscrewing the thumb screw 44 and may be then utilized as gauge 16 with the added feature that the shank 41 would not have to be withdrawn and the shank thereof inserted to position the second molar from the external oblique ridge of the mandible. Also the widths of the shanks 41 and 42 can be 5, 6 or 7 mm., if desired.

This arch indicator gauge can be used to not only align the distal surface of each of the second molars with the anterior contracting border of their respective massetter muscles, but also to properly space the buccal surface of the second molar from the external oblique ridge of the mandible in the same operation; thus locating the base points of a mandible dental arch swiftly and accurately.

The gauge 49 is operated much the same as the muscle arch indicator 16 when aligning the second molar with the anterior contracting border of the masseter muscle. The anterior contracting border of the muscle is located with the tip of the operator's finger placed outwardly of the check and the gauge 40 is inserted in the mouth, in such a position that the blunt head end 47 or 48 lies adjacent the tip of the operator's finger pressing against the outer surface of the cheek. Without moving or withdrawing gauge 40 from the mouth, the other blunt-headed end is aligned with the anterior contracting border of the masseter muscle on the opposite end of the mandibular arch. Due to the fact that distance $d$ illustrated in FIGS. 5 and 6 is of a predetermined value, that is either 5, 6 or 7 millimeters, the second molars can then be properly spaced from the external oblique ridge of the mandible 15, without removing the gauge from the mouth. This may be accomplished by now placing the tip of the blunt-headed end adjacent the external oblique ridge of the mandible 15. Since the length or distance $d$ is depending upon the pre-selection explained previously, 5, 6 or 7 millimeters the position of the buccal surface of the second molar has also been located and lies along the edge of shank 41 or 42 of the positioning gauge 40. Thus, the second molar on each end of the arch is positioned exactly in the arch by means of one gauge and without withdrawing the gauge.

The scales 49, 50, 45 and 53 may be utilized to facilitate the correct location of a second molar in a denture. When using these scales, the instrument of FIGS. 5, 6 and 7 is located with respect to the anterior contracting border of the masseter muscle as above described. A measurement is then taken from the distal surface of each second molar to a convenient reference point such as the distal surface of the lower cuspid, or incisor or the projected, surface of the vermillion border of the lips. The measurements may then be transferred to a denture by placing the appropriate portion of the scale adjacent the chosen reference point on the denture for one dimension and then spacing the second molar the appropriate distance from the external oblique ridge by use of the blunt heads 47 or 48 for the other dimension.

As previously stated, the shank 41 is readily disassembled and may be used much the same as gauge 16, but with the added feature that the distance $d$ is pre-selected.

In conclusion, once the proper positions of the second molars are known, the remainder of the arch may be readily constructed.

What I claim is:

1. For use in accurately locating the correct positioning of second molars in a mandibular arch, a first muscle arch indicator comprising an elongated and substantially flat handle shank having a measuring scale thereon, said shank having opposed sides and edges, the shank width being substantially larger than the shank thickness, a substantially enlarged blunt-headed finger rigidly connected thereto and extending transversely therefrom in a direction substantially normal to a plane disposed approximately normal to said sides, the blunt head of said finger being adapted to engage the anterior contracting border surfaces of the masseter muscle, and said finger presenting other surfaces projecting beyond surfaces of said handle shank for engaging a mandibular second molar while the blunt head of said finger engages said surfaces of said masseter muscle, a second substantially similar muscle arch indicator, and plate means for movably associating the shanks of each of the indicators in such a manner that in normal position the fingers of each of said indicators are spaced apart from one another and movable to an offset position with respect to one another while said shanks are normally substantially spaced apart and in parallel relationship and at the same time adapted to be moved to a substantially divergent relationship with respect to one another.

2. The invention in accordance with claim 1, wherein said elongated handle shanks are between approximately 5 and 7 mm. wide.

3. The invention in accordance with claim 1, wherein each of said shanks are pivotally connected to said plate means and one of these connections being such to render one of said muscle arch indicators removable with respect to said plate means.

4. The invention in accordance with claim 1, wherein each side of each one of said shanks includes a measuring scale thereon.

5. The invention in accordance with claim 4, wherein the starting index for each one of the scales is located on the associated blunt-headed finger.

References Cited in the file of this patent
UNITED STATES PATENTS

| | | |
|---|---|---|
| 878,507 | Coghlan | Feb. 11, 1908 |
| 1,685,109 | Weber | Sept. 25, 1928 |
| 2,237,378 | Thienemann | Apr. 8, 1941 |
| 2,722,747 | Fritz | Nov. 8, 1955 |